US006456372B1

(12) United States Patent
Hudy

(10) Patent No.: US 6,456,372 B1
(45) Date of Patent: Sep. 24, 2002

(54) STEERING ALIGNING APPARATUS AND METHOD

(75) Inventor: Paul Joseph Hudy, Swartz Creek, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/539,551

(22) Filed: Mar. 31, 2000

(51) Int. Cl.[7] .............................................. G01B 11/26
(52) U.S. Cl. ..................... 356/155; 356/139.09; 33/288
(58) Field of Search ........................... 356/155, 139.09; 33/288, 335, 336

(56) References Cited

U.S. PATENT DOCUMENTS

| | | | |
|---|---|---|---|
| 4,690,557 A | | 9/1987 | Wiklund ..................... 356/155 |
| 4,827,623 A | | 5/1989 | Goodell ........................ 33/288 |
| 4,899,218 A | * | 2/1990 | Waldecker et al. ............ 358/93 |
| 5,307,210 A | | 4/1994 | MacFarlane ................ 359/859 |
| 5,343,628 A | | 9/1994 | Ham ............................ 33/608 |
| 5,724,743 A | * | 3/1998 | Jackson ........................ 33/288 |
| 5,731,870 A | | 3/1998 | Bartko et al. .......... 356/139.09 |

* cited by examiner

*Primary Examiner*—Frank G. Font
*Assistant Examiner*—Layla Lauchman
(74) *Attorney, Agent, or Firm*—Laura C. Hargitt

(57) ABSTRACT

An apparatus and method are provided for aligning the steerable (front) wheels or hubs of a vehicle with the fixed (rear) wheels or hubs in substantially parallel longitudinal alignment. The steerable wheels are thus set in a straight ahead position for connection of a steering wheel to the steering linkage in the corresponding straight ahead position. Laser devices measure the relative angles of the front and rear wheel hubs as the vehicle or chassis is carried along an assembly line. A computer controlled power wrench then rotates the steering gear to longitudinally align the plane of the steerable hub on one side of the vehicle substantially parallel with the plane of the fixed hub in the same side. The steering wheel is then installed so that both the steering wheel and the steerable wheels are set in the straight ahead position. Additional features are also disclosed.

9 Claims, 2 Drawing Sheets

STEERING ALIGNING APPARATUS AND METHOD

TECHNICAL FIELD

This invention relates to vehicle steering alignment and, more particularly, to a method and apparatus for aligning the wheels or wheel hubs of a vehicle during assembly on a moving assembly line for attachment of the vehicle steering wheel in a straight ahead position while the vehicle wheels remain in substantially parallel alignment.

BACKGROUND OF THE INVENTION

It is known in the art relating to automotive vehicles to provide methods and apparatus for aligning the steerable front wheels of a vehicle with respect to the frame or other reference structure in accordance with predetermined alignment parameters. Such alignment procedures are usually carried out with the vehicle in a stationary position and with the associated steering wheel of the vehicle set in the straight ahead position. In some cases, means are provided for adjusting the rotational position of the steering wheel relative to the associated steering linkage when the steerable front wheels of the vehicle are aligned in the straight ahead position.

In connection with the planned assembly of a new vehicle, it was desired to eliminate any means for adjusting the steering wheel relative to the steering linkage after assembly of the wheel to the linkage. Thus, in order to assemble the steering wheel in the straight ahead position on the linkage, it would be necessary to first align the vehicle wheels in a straight ahead position and then attach the steering wheel to the steering linkage with the wheel in the straight ahead position. An efficient method and means for accomplishing the desired results was thus required.

SUMMARY OF THE INVENTION

The present invention provides an apparatus and method for accomplishing the desired purposes of aligning the front wheels of a vehicle to a straight ahead position substantially parallel with the rear wheels so that the steering wheel may be attached to the steering linkage with both the steering wheel and the steerable front wheels in their straight ahead positions. The apparatus and method developed for this purpose provide for alignment of the steerable wheels and attachment of the steering wheel while the vehicle structure is being assembled on a moving assembly line.

Terms such as "substantially parallel" and "substantially longitudinally parallel" as used in the specification and claims are intended to include not only exactly parallel alignment of vehicle wheels in a straight ahead position but also adjustments of the steerable wheels to provide toe-in or other adjustments such as caster and camber which may result in slightly non-parallel alignment of the vehicle wheels in the straight ahead position.

An apparatus according to the invention includes a tool rail or track running parallel and to one side of the centerline of a conveyor on which the partially assembled vehicle chassis is carried. Two sets of laser devices or boxes are carried on the tool rail. One of the laser devices aligns with one of the wheel hubs on a rear axle and the other aligns with a front wheel hub on the same side of the vehicle. Each of the laser devices includes a pair of laser heads which align with longitudinally spaced opposite sides of a machined surface of an associated hub. The laser heads are connected with known laser scanning equipment to indicate the relative longitudinal angle of the plane of the hub surface with respect to the tool rail and therefor with respect to the centerline of the conveyor on which the chassis is carried.

In the apparatus as developed, the rear wheel alignment box or laser device is fixed longitudinally but adjusts vertically for alignment with the rear axle of each vehicle as it passes by the laser device on the assembly line. In contrast, the front wheel alignment box or laser device is mounted to move vertically along the tool rail for a predetermined distance, as well as to move vertically as needed for alignment with the steerable front wheel hub of the vehicle. In this way, the laser device is able to continuously monitor the angular position of the front hub as the chassis moves along the line for the selected distance. The distance is made long enough to normally accomplish alignment of the steerable front wheels of the vehicle during the period of motion of the chassis over the selected distance.

The operating system for the front laser device or alignment box is programmed to coact with a power wrench mountable by an operator to a portion of the steering linkage of the vehicle, such as the steering gear or the end of the steering shaft, prior to assembly of the steering wheel. The front axle laser head. readings fed to a computer indicate the relative longitudinal angular position of the front wheel hub. The system then initiates operation of the power wrench to turn the steering linkage in the proper direction to move the steerable front wheel hubs to the same or substantially the same angle relative to the centerline of the conveyor as the angle of the rear wheel hub has with the centerline of the conveyor as measured by the rear laser heads.

When the relative angles of the front and rear hubs are equal or at a predetermined setting substantially equal, the power wrench operation is concluded and the wrench is removed from the assembly by the operator. At this point, the planes defined by the sensed machined surfaces of the two wheel hubs on the same side of the vehicle are positioned parallel or substantially parallel to one another so that the wheels are aligned in longitudinally substantially parallel positions which result in straight ahead motion of the vehicle in subsequent operation, Thus the wheels are aligned in the straight ahead position. At this point, the steering wheel for the vehicle may be assembled to the steering shaft with the wheel position in the desired straight ahead position so that the final assembly is aligned with the steering wheel and front wheels both in the desired straight ahead position at the time of vehicle assembly.

In accordance with the invention, a method of operation of a particular embodiment of alignment apparatus is as follows:

First, a laser triggers the front wheel alignment box to track the speed of the assembly line.

While tracking the front wheel hub, the trigger laser is servo-driven up to find the top of the target front wheel hub. The two longitudinally spaced alignment laser heads are then servo-driven outward to find the leading and trailing edges of the machined surface which is the target measuring surface for the lasers.

Correct height and width information is sent to the rear wheel alignment box which causes the rear alignment box to move to the correct height and then wait for the passage of the rear wheel hub.

When both rear wheel hub lasers are positioned on the target, an instant measurement of the wheel angle is taken and stored in a computer.

The system then signals the operator to start correcting the front wheels. A power wrench will automatically turn clockwise or counterclockwise depending on the angle of the front wheel measurement relative to the rear wheel hub measurement angle.

The power wrench is shut off when both wheel angles match so that the wheel hubs are aligned with their planes parallel or substantially so. A signal is then given to the operator to remove the power wrench.

The front wheel alignment box returns to its starting position and waits for the next chassis.

The offset angle is archived by the computer.

An overtravel limit will stop all motion and operation if the front wheels are not aligned in the given travel length of the front laser head. A homing routine will reset the system.

An exemplary system in accordance with the invention includes the following elements:

A fixed alignment box for the rear wheel hub.

A moving alignment box for the front wheel hub.

A control panel with programmable computer (PC) and motion controller.

A fifty foot rail system to carry the front wheel alignment box.

Interface and motion control software programming for controlling the system in accordance with the previously outlined method.

These and other features and advantages of the invention will be more fully understood from the following description of certain specific embodiments of the invention taken together with the accompanying drawings.

DESCRIPTION OF THE PREFERRED EMBODIMENT

Figure 1:
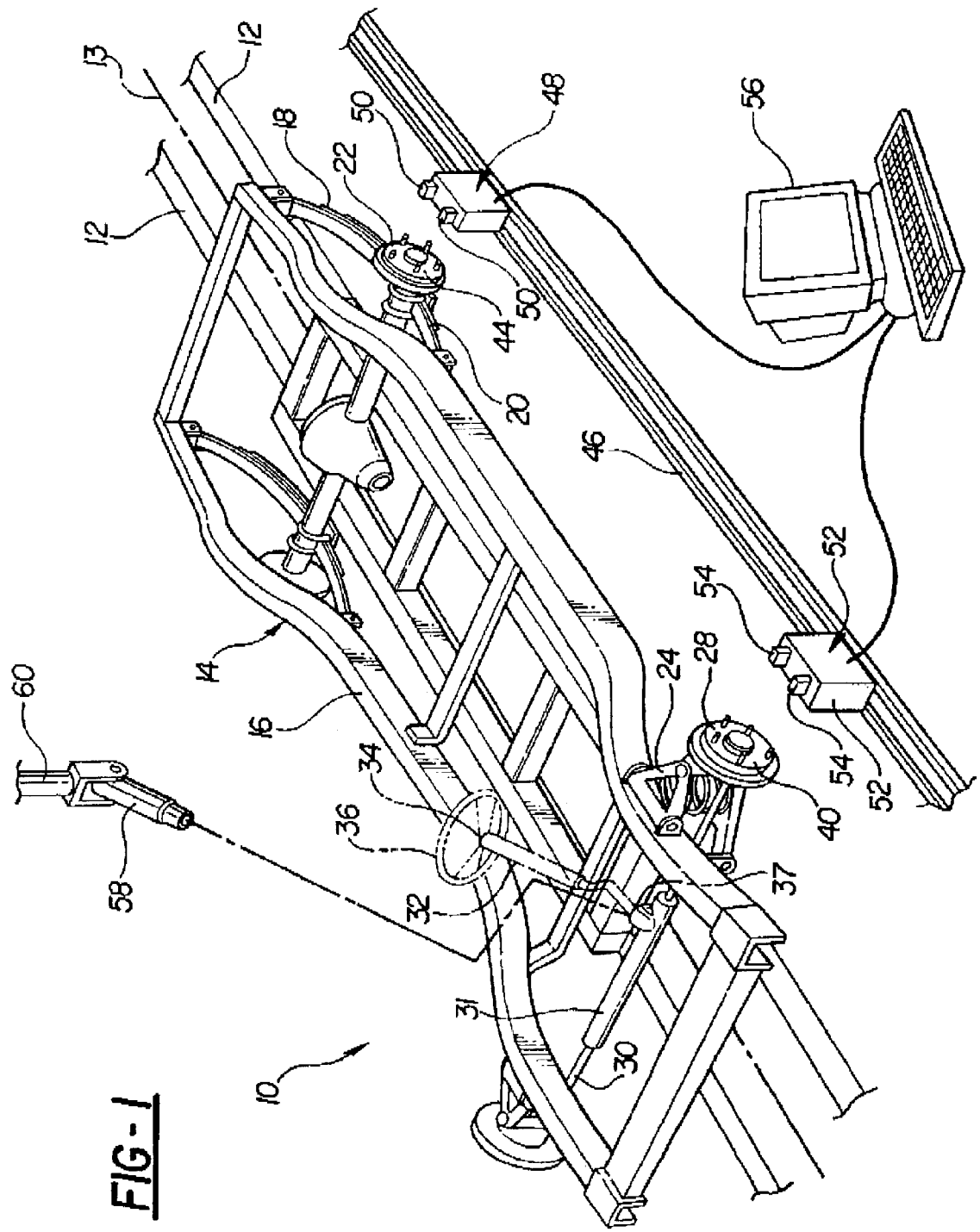
FIG. 1 is a pictorial view of a partially assembled vehicle chassis carried on a moving conveyor of a vehicle assembly line and showing associated alignment apparatus in accordance with the invention.
Figure 2:
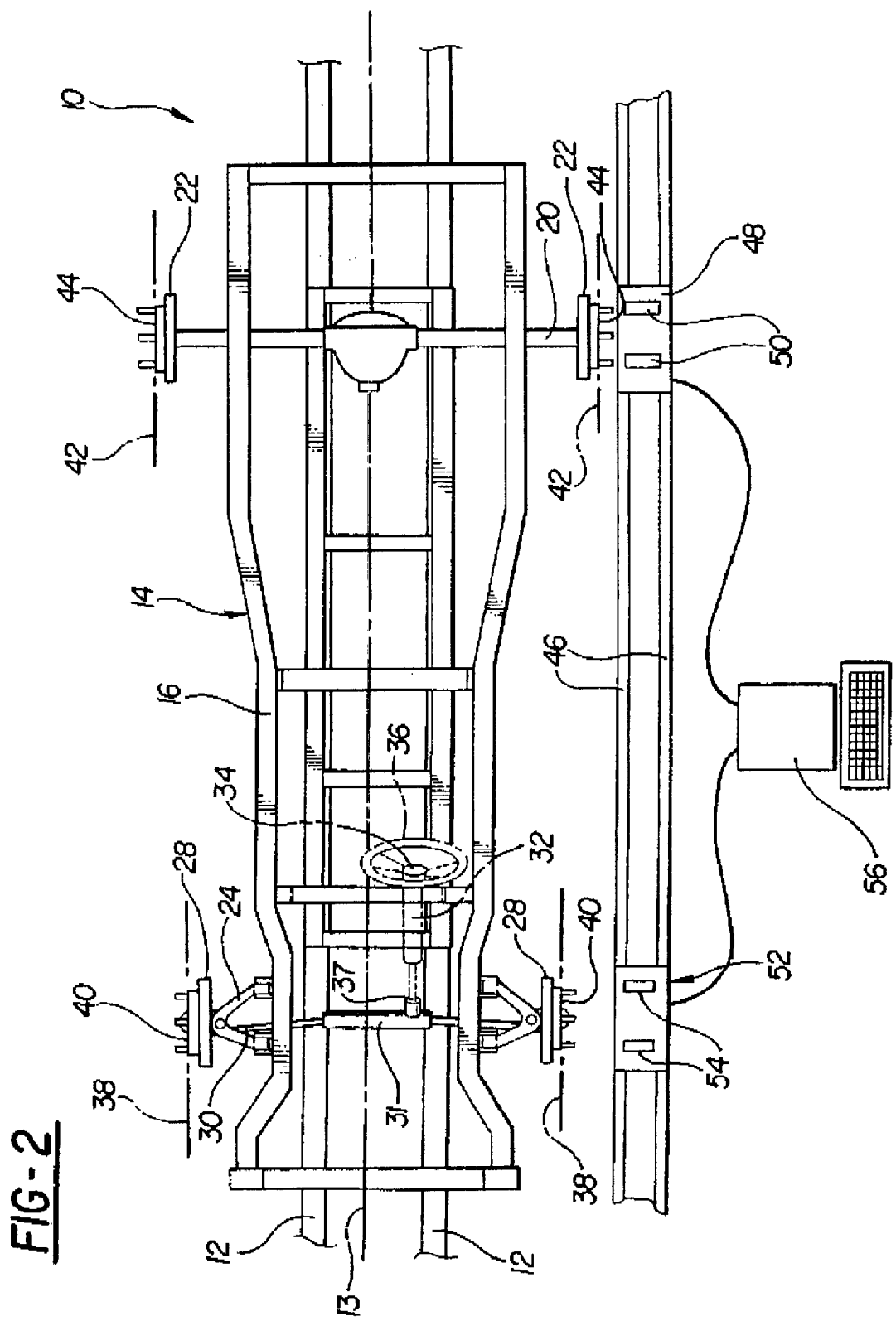
FIG. 2 is a schematic illustration of a steering alignment apparatus associated with a vehicle chassis on a moving assembly line.

Referring now to the drawings in detail, numeral 10 generally indicates a vehicle assembly line including a moving conveyor 12 on which is carried a plurality of partially completed vehicle chassis 14, only one of which is shown. Chassis 14 includes a frame 16 including a rear suspension 18 supporting a rear axle 20 carrying a pair of laterally opposite wheel hubs 22. The frame also includes a suspension carrying a front axle or independent suspension means 24 connected with a pair of front wheel hubs 28. The front wheel hubs are conventionally mounted on pivotable steering knuckles or the like, not shown, which allow steering action of the front wheel hubs 28 by pivoting out of the straight ahead position.

A steering linkage 30 connects the hubs 28 together to control steering angles of the front hubs to allow turning of the vehicle without excessive lateral sliding of the turning wheels. Linkage 30 connects the hubs with a steering gear 31 controlled by a steering shaft 32 extending up into the driver's compartment and forming a part of the steering linkage. The steering shaft 32 conventionally has a splined end 34 to which a steering wheel 36, shown in phantom, is applied to complete the steering linkage assembly. The steering gear 31 also has a splined end 37 to which the steering shaft 32 is connected. As is common, the steering wheel is designed to be installed in a specific angular position when the steerable front wheel hubs are aligned in a straight-ahead position. Thus, the steering wheel indicates to the driver when the wheels are set for straight movement of the vehicle along its path. Such positioning is also desirable for appearance, as well as to make best use of control switches or other items, which may be mounted on the steering wheel.

In the exemplary embodiment, proper alignment and installation of the steering wheel requires that the steering linkage and the front wheel hubs first be positioned so that planes 38 formed by machined surfaces 40 are aligned substantially parallel with corresponding planes 42 established by machine surfaces 44 of the rear wheel hubs 22.

The present invention provides both the means and method for aligning the steerable front wheels of the vehicle chassis so that the steering wheel 36 can be installed in its proper orientation while the vehicle is moving on the assembly line. For this purpose, the apparatus according to the invention includes a tool rail or track 46 which extends longitudinally alongside the conveyor 12, running parallel to the central axis or centerline 13 of the conveyor. On the tool rail, is mounted in fixed longitudinal position a first laser device 48 having longitudinally spaced dual measuring lasers or laser heads 50 which are moved into general vertical alignment with the location of the rear wheel hub on one side of the vehicle as it passes along the conveyor beside the laser device 48.

A similar laser device 52 having longitudinally spaced dual alignment lasers or laser heads 54 is mounted on the tool rail and is arranged for movement along the rail for a predetermined distance in alignment with the front wheel hub on the same side of the chassis as the chassis moves on the conveyor along the assembly line. In both laser devices, the lasers 50, 54 are positioned or adjustable to indicate from and measure at outer edges of the machined surfaces 44, 40 of the rear and front wheel hubs, respectively, for indicating the angular position of the wheel hubs relative to the centerline of the conveyor as well as of the tool rail on which the laser devices are mounted. To control their action, the laser devices 48, 52 are connected with an adjacent control panel 56 including a programmable computer and motion controller, not shown. Suitable software is also provided with necessary mechanical actuators to provide the desired operations to be subsequently set forth in carrying out the purposes of the invention. One of the devices controlled from the panel 56 is a power wrench 58 which is supported by a suitable overhead crane or robot arm 60 and is engagable with the splined end 37 of the steering gear or with the splined end 34 of the steering shaft 32, as will be subsequently described.

The method of operating the apparatus previously described in order to carry out the purposes of the invention, includes the following steps:

With the front laser device 52 set in an initial position at the beginning of its path of motion, a laser or other suitable means senses the approach of the front wheel hub on one side of a vehicle moving on the assembly line and moves with the hub 28 at the speed of the line.

While tracking the front wheel hub, a trigger laser is driven to find the top of the target wheel hub 28. The two alignment lasers 54 are then servo-driven outward to find the leading and trailing edges of a machined planar surface 40 of the hub defining a plane 38.

Information as to the height and width of the target hub is sent to the rear wheel laser device 48. These lasers are then moved to the correct position and wait for the rear target hub 22 to reach the rear laser device 48.

When both rear measuring lasers 50 fall onto the target surface 44, an instant measurement of the wheel angle is taken and stored in the computer. The measured angle is the relative angle of the plane 42 of the rear hub surface measured in the longitudinal direction relative to the longitudinal centerline 13 of the conveyor on which the vehicle chassis 14 is being carried.

The system then signals the operator to start correcting the front wheels by selecting the proper switch on the control panel. The power wrench 58 is attached to the splined end 34 of the steering wheel or the splined end 37 of the steering gear prior to initiation of wheel angle correction by the operator.

Upon initiation, the power wrench 58 automatically turns the steering gear 31 clockwise or counterclockwise depending on the angle of the front wheel as measured by the alignment lasers relative to the rear wheel angle stored in the computer.

When the angle of plane 38 defined by surface 40 of the front wheel hub becomes parallel in a longitudinal direction with plane 42 defined by the surface of the rear wheel hub, the front and rear wheel hubs are aligned in longitudinally parallel planar alignment where the vehicle wheels are set for straight ahead running.

The power wrench is then shut off and a signal is given to the operator to remove the wrench from the splined end 34 of the steering shaft or steering gear.

At this point, the steering wheel 36 may be installed with its angular orientation in the straight ahead position so that the front wheels and the steering wheel are in proper complementary relation.

Before or after installation of the steering wheel, the front wheel alignment box returns to its starting position and waits for the next chassis to repeat the process.

If desired, the angle of adjustment made in the system is archived by the computer for possible future use.

Should the wheel adjustment not be completed by the time the front laser device reaches the far end of its travel, an overtravel limit will stop all motion and operation of the system so that proper alignment of the wheel may be completed.

The system may then be reset for normal operation.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. Apparatus for alignment of steerable and nonsteerable vehicle wheel hubs mounted on a vehicle chassis on a moving assembly line wherein the steerable wheel hubs are interconnected by steering linkage on the chassis, said apparatus comprising:

a first laser device operative to measure a plane of the nonsteerable wheel hub on one side of a vehicle chassis moving on an assembly line;

a second laser device operative to measure a plane of the steerable wheel hub on said one side of the chassis;

a power device operative to move the steering linkage to adjust the plane of the steerable wheel hub to a predetermined condition related to a corresponding plane of the nonsteerable hub; and control means operative to control operation of the power device to move the steerable hub to the predetermined condition.

2. Apparatus as in claim 1 wherein said predetermined condition comprises substantially parallel longitudinal alignment of the plane of the steerable wheel hub with the plane of the nonsteerable wheel hub.

3. Apparatus as in claim 1 wherein said first and second laser devices each include a pair of alignment lasers positioned to sense the relative positions of longitudinally opposite portions of the respective wheel hub.

4. Apparatus as in claim 1 wherein said second laser device is movable with the steerable wheel hub to maintain measurement of the relative plane angle thereof during adjustment of the angle as the chassis moves along the assembly line until the predetermined condition is reached and the adjustment is completed.

5. Apparatus as in claim 1 wherein said power device is a power wrench correctable with the steering linkage to turn the steerable wheel hub to substantially longitudinally parallel planar alignment.

6. A method for aligning vehicle wheel hubs during vehicle assembly on a moving assembly line, said method comprising:

determining an angle relative to a longitudinal reference of a plane of a nonsteerable wheel hub on one side of a vehicle chassis;

determining an angle relative to said longitudinal reference of a plane of a steerable wheel hub on the same side of the chassis;

adjusting steering linkage for the steerable wheel hub to align the plane of the steerable wheel hub at a predetermined setting relative to the nonsteerable wheel hub to place the wheel hubs in substantially parallel longitudinal alignment; and fixing a steering wheel in a straight-ahead position on the steering linkage while the planes of the wheel hubs remain in said substantially parallel alignment.

7. A method as in claim 6 including using a pair of spaced alignment lasers to determine the relative angle of the nonsteerable wheel hub.

8. A method as in claim 7 including using a pair of spaced alignment lasers to determine the relative angle of the steerable wheel hub.

9. A method as in claim 8 including using an automatically controlled power wrench to adjust the steering linkage to position the planes of the steerable wheel hubs.

* * * * *